United States Patent [19]
Russ

[11] 3,879,070
[45] Apr. 22, 1975

[54] TUBE COUPLING MECHANISM
[75] Inventor: Edward F. Russ, Baldwinsville, N.Y.
[73] Assignee: Carrier Corporation, Syracuse, N.Y.
[22] Filed: Apr. 22, 1974
[21] Appl. No.: 462,836

[52] U.S. Cl. ............................. 285/342; 285/382.7
[51] Int. Cl. .............................................. F16l 19/06
[58] Field of Search ......................... 285/342, 382.7

[56] References Cited
UNITED STATES PATENTS

| | | | |
|---|---|---|---|
| 2,452,278 | 10/1948 | Woodling | 285/343 |
| 2,466,527 | 4/1949 | Wolfram | 285/382.7 X |
| 2,511,134 | 6/1950 | Strauberg | 295/382.7 X |
| 2,691,537 | 10/1954 | Bashark | 285/340 |

FOREIGN PATENTS OR APPLICATIONS
880,495  10/1961  United Kingdom ................ 285/342

*Primary Examiner*—Andrew V. Kundrat
*Attorney, Agent, or Firm*—J. Raymond Curtin; Thomas J. Wall

[57] ABSTRACT

A coupling for joining a tube to a fitting having a first elastomeric leakproof seal acting between a nipple affixed to the fitting and the tube and a second leakproof seal acting between a compression sleeve and the tube. Control means are provided for regulating the amount of compression applied to the sleeve and the compressible gasket to provide optimum sealing pressures between the cooperating parts of the coupling and to prevent the parts from being deformed to a point where the sealing properties of the coupling are negated.

5 Claims, 2 Drawing Figures

TUBE COUPLING MECHANISM

BACKGROUND OF THE INVENTION

This invention relates to a short coupling and, in particular, to a coupling device for servicing refrigerant systems.

As herein used, the term "refrigerant systems" refers to any type of system utilizing a compressible fluid to remove heat (energy) from a defined area. In servicing such systems, it is generally found necessary to replenish or sometimes replace the refrigerant. Conventionally, this task is accomplished by means of a service valve that is attached to the service or supply line of the system. Because of the space constraints imposed, the service valve is, in most cases, attached to the service line by means of a short coupling, that is, a coupling which permits the service line to be positioned and aligned with the valve body with a minimum amount of relative movement therebetween.

As exemplified by U.S. Pat. No. 1,336,547, it is typical in couplings of this nature to insert the service line into a nipple that is connected to the valve body and to lock the two elements together by means of a compression nut and a coacting compression sleeve. The sleeve is positioned over the service line and is adapted to cooperate with the internal surface of the nut whereby the sleeve is forced into biting metal-to-metal contact with the line as the nut is threaded onto the nipple. The bite is intended to create a metal-to-metal joint to prevent the coupling from leaking. However, if the compression sleeve is either over-compressed, thereby producing deformation beyond the elastic limits of the material involved, or under-compressed, the metal-to-metal joint becomes ineffectual and leakage occurs. Similarly, if the cooperating parts of the coupling are not accurately dimensioned, or become deformed in handling or the like, a completely leakproof joint cannot be achieved by this type of prior art device.

To overcome some of the problems associated with couplings relying upon a compression sleeve to form a seal, various types of elastomeric pressure sensitive sealing devices have been developed exhibiting varying degrees of success. In U.S. Pat. No. 2,691,537, such an arrangement is disclosed in which the elastomeric gasket is inserted between the fitting nipple and the service line. The gasket is compressed in assembly, as for example, by a spring loaded washer, to provide a sealing joint. Here, as in the case of the metal-to-metal seal employing a compressible sleeve, little or no control is provided over the amount of compression exerted on the elastomeric sealing member and thus the sealing member is susceptible to being either over or under compressed. Furthermore, most elastomeric seals known in the art generally produce a relatively weak joint between the tube and the fitting thereby permitting the tube to shift axially in response to internal pressures, vibrations, or the like.

SUMMARY OF THE INVENTION

It is therefore an object of the present invention to improve couplings for securing a tube to a service fixture.

A further object of the present invention is to improve tube fittings whereby the fitting is both leakproof and reusable.

Another object of the present invention is to produce optimum sealing and locking conditions in a service valve fitting by controlling the amount of pressure exerted by the coacting parts of the fitting.

Yet another object of the present invention is to provide a tube fitting capable of locking non-concentric or under-sized tubes to a support member in a leakproof manner.

These and other objects of the present invention are attained by means of a tube fitting having an externally threaded nipple for receiving a tube internally therein, the nipple further having an internal counterbore in the end face thereof for supporting an elastomeric gasket between the outer periphery of the tube and the nipple; a collapsible sleeve having a radial flange adapted to seat against the end face of the nipple and a hub extending axially from the flange into the counterbore for compressing the gasket to a predetermined load when the shoulder is positioned against the nipple, the sleeve further having an elongated body terminating in a deformable section for producing a metal-to-metal pressure seal against the tube and a second collapsible rib section for applying a bite to the tube to prevent tube pullout; a compression nut threadable onto said nipple having internal cam surfaces arranged to compress the deformable section and the biting rib of said sleeve against the tube as the nut is threaded onto the nipple; and control means associated with the nut to regulate the amount of compression applied by the cam surfaces to the sleeve and to seat the sleeve flange against the end face of the nipple.

BRIEF DESCRIPTION OF THE DRAWING

For a better understanding of the present invention as well as further objects and further features thereof, reference is had to the following detailed description of the invention to be read in connection with the accompanying drawing, wherein.

DESCRIPTION OF THE PREFERRED EMBODIMENT

Figure 1:
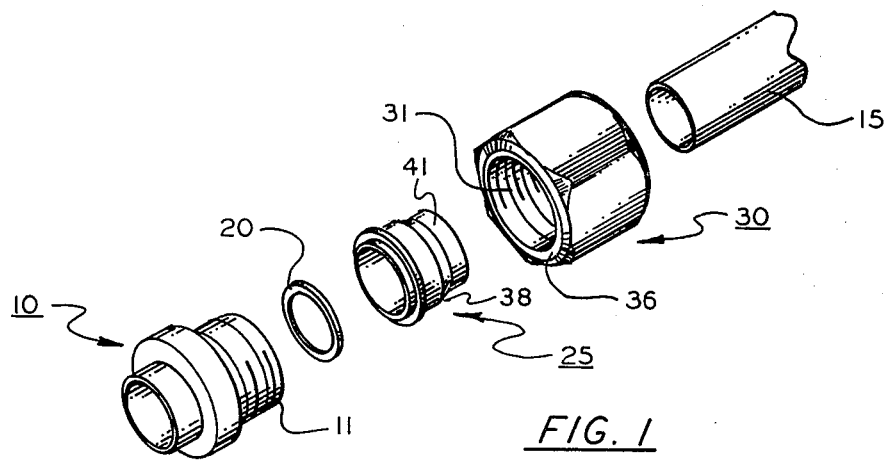
FIG. 1 is an exploded view showing the various components of the fitting of the present invention.

Referring now to the drawings, there is illustrated a nipple 10, that is affixed by any suitable conventional means, such as brazing or the like to an operable member, or alternatively is machined as an integral part of the operable member. In practice, the operable member can take the form of a service valve as generally employed in the refrigeration art. The outer end of the nipple is provided with a male thread 11 which terminates at the bottom of the thread in a radially extending shoulder 12, the function of which will be explained in greater detail below.

An axially aligned opening 13 passes through the nipple and has an enlarged bore 14 machined therein adapted to receive in loose sliding relationship therein tube 15 which is to be coupled to the fitting. A second further enlarged counterbore 16 is machined in the end face 18 of the nipple. The counterbore is dimensioned to receive an elastomeric deformable gasket 20.

The gasket is fabricated of any suitable resilient material capable of being deformed against the inner surface of the nipple and the outer surface of the tube 15 to establish a leakproof seal therebetween. Preferably, the gasket is formed of a material that is relatively inert in respect to the substance to be passed through the coupling. Neoprene, nitrile and vitron rubber gaskets have been found to possess the above-noted desired characteristics when employed in a refrigeration service valve system.

A compression sleeve 25 is passed over the outer surface of tube 15. One end of the sleeve is provided with a radially extended flange 26 and an axially extended hub 27. In assembly, the flange is adapted to seat against the end face of the nipple with the extended hub 27 being positioned within counterbore 16. The flange 26 serves as a control device in the assembly to regulate the depth to which the hub can penetrate the counterbore and thus limiting the amount of compressioning pressure applied to the deformable gasket. The size and resiliency of the gasket are preselected so that when the shoulder is seated against the end face of the nipple, the hub will deform the gasket sufficiently to establish a pressure-tight seal against both the nipple and the tube. The resilient characteristics of the gasket are such that the gasket fills any void created between the coacting parts, as for example, where the tube is undersized, out of round, or otherwise misformed. This void filling property of the gasket is shown slightly exaggerated in FIG. 2, in regard to an indentation in the wall of the tube. As can be seen, the compression control feature of the instant device, combined with the resilient property of the gasket, is capable of delivering a leakproof seal against the tube over a wide range of conditions.

Figure 2:
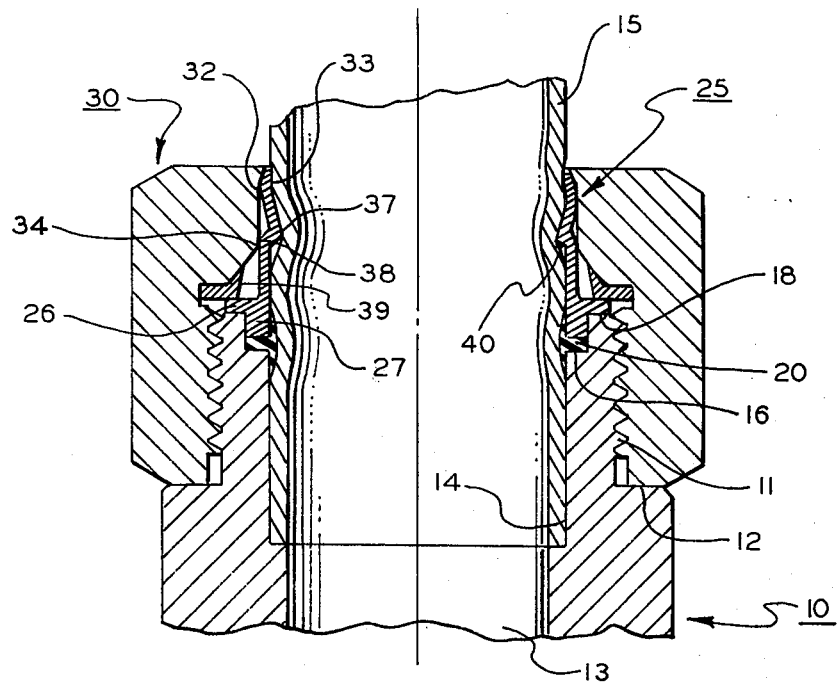
FIG. 2 is a partial sectional view showing the components illustrated in FIG. 1 in assembly.

Over the main body of the compression sleeve, that is, the portion of the sleeve extending from the flange in a direction opposed to the hub, is passed a compression nut 30 having a female thread adapted to mate with the male thread upon the nipple. The nut further includes an axial aligned aperture having two camming surfaces 32, 34 being undisturbed to operably communicate with preselected regions on the compression sleeve. As the nut is threaded to the nipple, the first camming surface 32, which is obliquely positioned in regard to the radial plane of the nut, moves into depressing contact with collapsible end portion 33 of the sleeve as seen in FIG. 2. The second camming surface 34 simultaneously moves into depressing contact against a raised section 38 formed at about the midsection of the sleeve body. Under the combined influence of the two camming surfaces, the body of the sleeve is forced inwardly towards the outer surface of the tube. It should be noted that the wall of the sleeve body is relatively thin in relation to the extended hub portion whereby the hub tends to retain its original gasket deforming posture as the body of the sleeve is cammed inwardly. In this manner, the control provided by the hub and flange arrangement over the depression of the gasket remains understood during the camming operation.

In practice, as the nut is threaded onto the nipple, the first camming surface 32 depresses the collapsible free end portion of the sleeve body into intimate contact against the outer wall of the tube. Preferably, the compression sleeve is formed of a relatively ductile material having a hardness that is greater than the hardness of the tube. As a result, the collapsible free end portion of the sleeve is mechanically deformed by the induced crimping action to form a continuous metal-to-metal seal about the tube.

It has been found that the metal-to-metal seal, formed at the end of the sleeve, although capable of carrying out the desired secondary sealing function, is relatively weak in resisting axial forces exerted by the tube against the sleeve. Under adverse loading conditions, the tube would ordinarily be subjected to axial shifting which would break the seal and, in extreme cases, the tube could pull out of the fitting. In the present invention, axial movements or pullout of the tube within the fixture is substantially reduced or eliminated by means of a locking mechanism in the form of an internal tooth 37 formed about the mid-region of the sleeve body. The tooth is formed by machining an undercut within the interior wall of the sleeve characterized by a radially extended surface 40. A relatively sharp cutting edge 37 is thus formed upon the tooth whereby the tooth is able to readily penetrate the tube wall as the sleeve is compressed by the nut.

The sleeve is also characterized by the formation of a raised working surface 38 about the outer wall of the sleeve; the raised portion being positioned substantially opposite to the biting edge of the tooth. This raised surface can be fabricated by reducing the outside diameter of the sleeve slightly from the plane of the tooth forming surface rearwardly toward the end 33. This can best be seen as the reduced section 41 in FIG. 1. In operation, the second camming surface 34 is arranged to move into contact with this raised surface on the sleeve and acts to force the tooth perpendicularly into "biting" relationship with the tube. Because of the tooth profile, the sleeve is forced inwardly and downwardly toward the nipple thus tending to position the flange in relation to the end face of the nipple. A control surface 39 is provided on the interior surface of the nut that is arranged to move into contact with the flange to securely hold the flange against the nipple thus insuring that optimum deformation of the gasket is maintained to provide a leakproof seal.

A second control means is also herein provided for regulating the amount of compression produced in the sleeve body. A flat 36 (FIG. 1) is machined upon the leading edge of the compression nut which is located at some fixed axial distance from the two internal camming surfaces. The flat is adapted to complement the external shoulder 12 formed upon the nipple and provides an arresting means to limit the distance that the nut can be threaded onto the nipple. When the flat or control surface is brought into close proximity or actual contact against the nipple shoulder, the amount of compression exerted by the camming surfaces upon the pre-positioned collapsible end portion 33 and raised portion 37 on the sleeve is controllable within definable limits whereby the sleeve is neither under-stressed nor over-stressed.

Preferably, the first control surface 39, acting against the sleeve flange, and the second control surface 36, acting against the nipple shoulder, should bottom against their respective contact surfaces simultaneously. Because of normal machining tolerance involved, one control surface may bottom slightly before the other. However, the system has sufficient built-in elasticity whereby initial bottoming of one control surface before the other will not have an adverse effect upon the sealing properties of the coupling. In fact, leakproof couplings have been formed using the above-disclosed apparatus wherein the compression nut is threaded to a position close to, but not in actual contact with, the control shoulder formed upon the nipple.

It should be further noted that the sleeve compression control feature of the present invention also allows the coupling to be reused in the event that the fitting must be dismantled, as for example, for maintenance or the like. As should be clear from the discussion above that, because the amount of compression exerted by the sleeve against the tube is accurately regulated, the sleeve is not over-compressed against the tube. As a result, the present fitting can be dismantled and reassembled with no adverse effect upon its sealing properties. In fact, couplings of this type have been so dismantled and recoupled a number of times and continued to deliver the desired sealing to prevent leakage.

Accordingly, the instant coupling represents an economical reusable device which can, because of its double sealing arrangement, deliver leakproof service and at the same time prevent axial shifting of the tube within the coupling.

While this invention has been described with reference to the structure disclosed herein, it is not confined to the details as set forth, and this application is intended to cover any modifications or changes as may come within the scope of the following claims.

What is claimed is:

1. Apparatus for coupling a tube to a fitting including
a nipple attached to said fitting having an axially aligned aperture passing therethrough, the aperture further containing an enlarged bore adapted to receive said tube therein and a second enlarged counterbore adapted to receive a deformable gasket, said bore and counterbore extending inwardly from the end face of said nipple, said nipple further having an external thread formed thereon extending rearwardly from said end face and being terminated at a predetermined depth by a radially extending shoulder,
a pressure deformable gasket positioned within said counterbore intermediate said tube and said nipple,
a compressible sleeve passing over said tube and having a flange seatable against the end face of said nipple, said sleeve further including a hub extending axially from said flange a predetermined distance into said counterbore whereby the hub deforms the gasket into sealing contact between said tube and said nipple when the flange is seated against the end face of said nipple, and an elongated body section extending axially from said flange in a direction opposite to said hub, the body having a circumferentially extended tooth formed on the interior wall thereof,
a compression nut threadable upon said nipple having first and second camming surfaces positioned thereon to compress the free end of the sleeve body and the circumferentially extended tooth into contact against the tube as the nut is threaded onto the nipple, and
a control surface upon said nut positioned in relation to said camming surfaces such that the free end of the sleeve is compressed under a predetermined load into sealing contact against the tube by said first camming surface and the circumferential tooth is compressed under a predetermined load into holding contact against said tube by said second camming surface when the control surface is seated against the shoulder of said nipple.

2. The apparatus of claim 1 wherein said gasket is formed of a resilient elastomeric material.

3. The apparatus of claim 1 wherein said hub on said sleeve has a wall thickness relatively greater than the wall thickness of said body of said sleeve so that the hub retains its original gasket compressing posture as the sleeve body is deformed against the tube.

4. The apparatus of claim 1 wherein said compression nut has a second control surface for securing the sleeve flange against the nipple when said first control surface is in close proximity with said shoulder of said nipple.

5. The apparatus of claim 4 wherein the compressible free end section of said sleeve is provided with a reduced cross-sectional area in relation to the body of said sleeve.

* * * * *